Aug. 29, 1939.  D. L. GALLUP  2,170,893
BRAKE
Filed Nov. 20, 1935  2 Sheets-Sheet 1
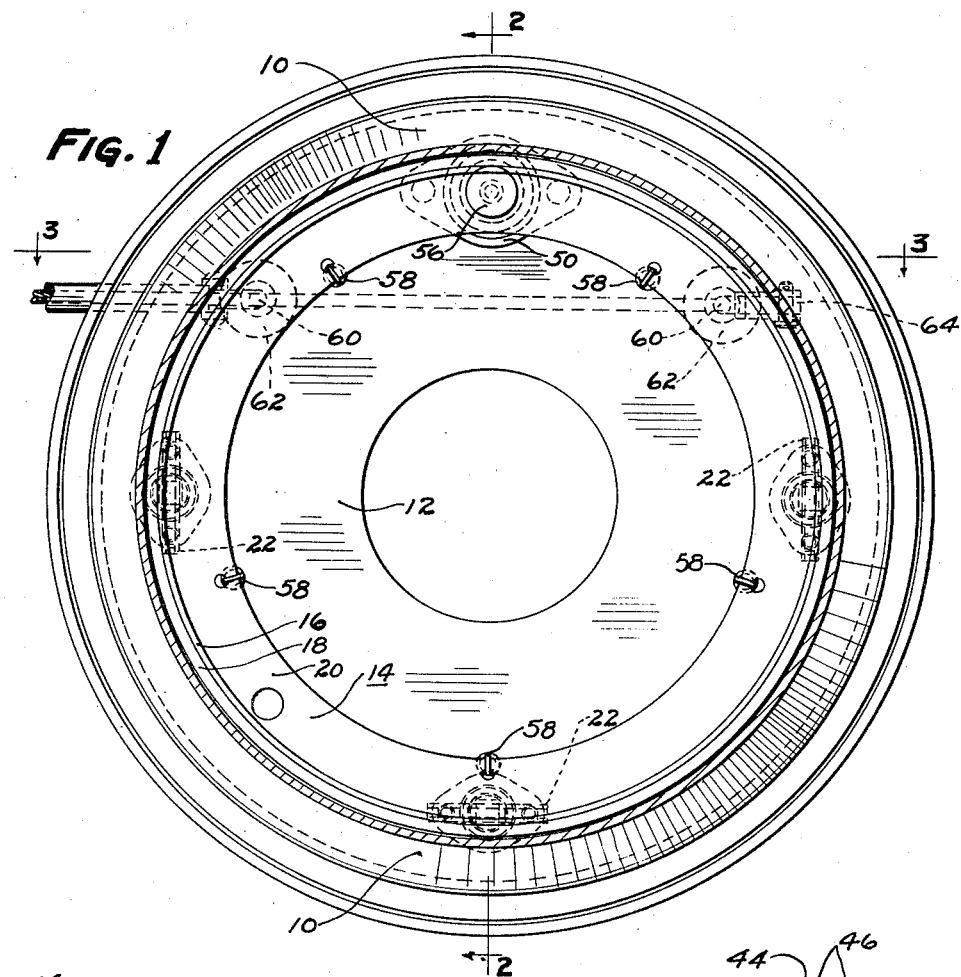
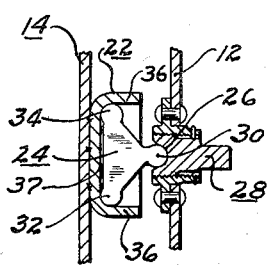
FIG. 4
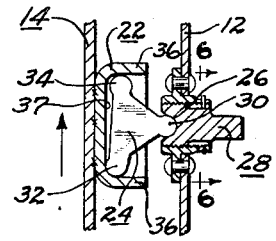
FIG. 5
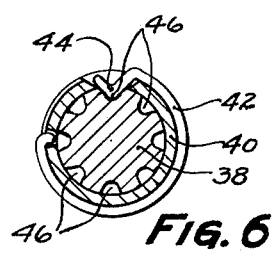
FIG. 6
INVENTOR.
DAVID L. GALLUP.
BY
ATTORNEY, Aug. 29, 1939.　　　D. L. GALLUP　　　2,170,893
BRAKE
Filed Nov. 20, 1935　　　2 Sheets-Sheet 2
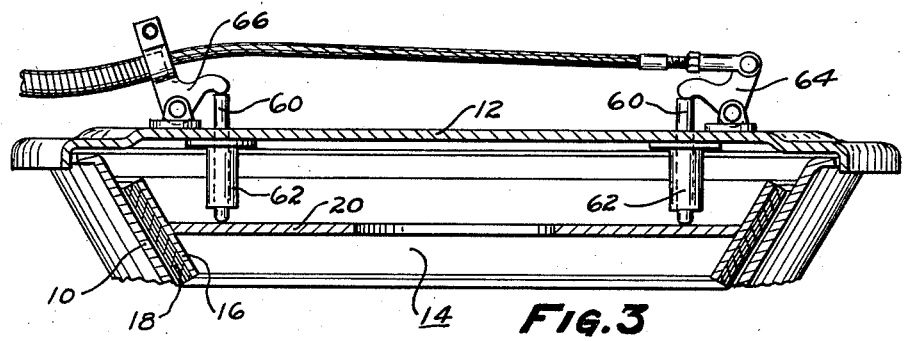
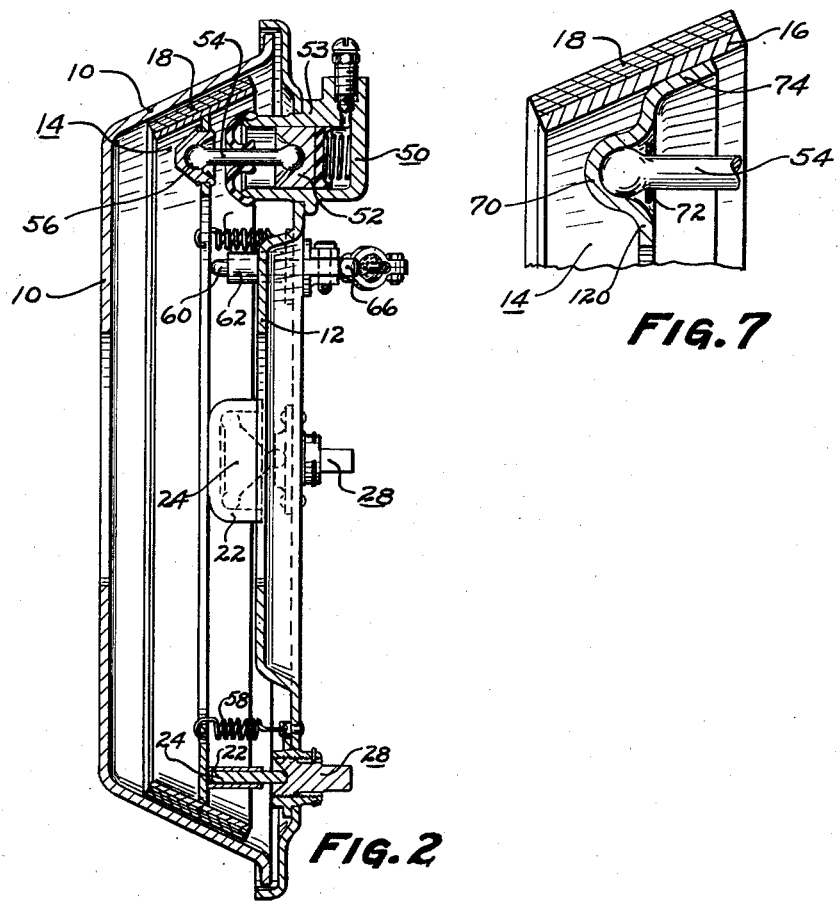
INVENTOR.
DAVID L. GALLUP.
BY R. E. Wilson
ATTORNEY.

Patented Aug. 29, 1939

2,170,893

UNITED STATES PATENT OFFICE 2,170,893

BRAKE

David L. Gallup, South Bend, Ind., assignor to Bendix Products Corporation, South Bend, Ind., a corporation of Indiana Application November 20, 1935, Serial No. 50,751

12 Claims. (Cl. 188—71)

This invention relates to brakes and more particularly to vehicle brakes of the cone type.

Cone type brakes, not unlike cone clutches, require extremely high and uniformly applied contact pressures. In the past, serviceable brakes of this type were obtained by being made operatable through the application of "brute" force upon the braking element at several points. The increasing demand for light pedal pressures has consequently out-moded this type of brake. Also, brakes having full peripheral brake bands are generally conceded to have too high self-energization and set-up chatter when used with the conventional type of drum brake.

In the novel brake disclosed herewith it will be seen that the highly self-actuating friction element used in a type of brakes requiring high operating pressures, in combination with novel means of controllably transferring the self-energization to apply pressure, will give an extremely efficient, smooth-acting, and easily operated assembly.

An object of the invention is to provide a simple, powerful brake, capable of controllably using full self-actuation.

Another object is to provide a brake capable of attaining uniform brake surface pressures throughout its periphery with but a single point of initial application.

Still another object is to provide a brake having uniform servo-action, braking effect and requiring the same actuating pedal travel, whether the vehicle be moving forward or backward during the period of brake application.

A feature of this invention relates to a conical type of brake shoe or stator having a full 360° of drum contact.

Another feature relates to brake operating means for applying and anchoring the brake uniformly during either direction of drum rotation, which preferably comprises a triangular lever rockably mounted at its apex on the backing plate and suitably housed in a box-like structure secured to the friction element.

Still another feature relates to adjustable means to take up lining wear; to provide uniform clearance between the friction means and the drum, and also to confine the friction element laterally when in the "brake-off" position.

The above and other objects and features of the invention, including various novel and desirable particular combinations and constructions of the various parts of the brake, will be apparent from the following description of the specific embodiment shown in the accompanying drawings in which:

Figure 1 is a section through the brake just inside the head of the brake drum, showing the friction element in side elevation;

Figure 2 is a view taken substantially on the line 2—2 of Figure 1;

Figure 3 is a view taken substantially on the line 3—3 of Figure 1;

Figure 4 is a side view of one of the triangular actuating levers in the "brake-off" position;

Figure 5 is a view similar to Figure 4 with the triangular lever in the applied position;

Figure 6 is a sectional view taken on the line 6—6 of Figure 5; and

Figure 7 is a fragmentary radial section through the applying means showing a modification of the invention.

The illustrated brake includes a conical brake drum 10 at the open side of which is a backing plate 12. Housed within the chamber formed by these two members is a friction element 14, suitably supported on the backing plate 12 by means to be hereinafter described.

The friction element 14 comprises an annular member having a frustro-conical rim 16 lined on its outer periphery with any suitable friction material 18, and an annular web 20 upon which is welded or otherwise suitably secured in spaced relation therewith rectangular cages 22. Triangular links or levers 24 are positioned in the cages 22 and are rockably mounted as at 26 in the adjustable seats 28. The triangular levers 24 are formed with well rounded portions 30 at their apexes to permit shifting of the element 14 with change in direction of drum rotation. Likewise, the other corners 32 and 34 of the triangular levers are well rounded and engage the end walls 36 and inner faces 37 of the cages 22.

The seats 28 for adjusting the rocking links 24 comprise plug members 38 having concave bearing surfaces engaging the apexes 30 of the links, and are threaded into suitable supports 40 secured on the backing plate 12. The ends of the plug members 38 project through the backing plate 12 and are shaped to receive a wrench or other actuating means to adjust the brake. The plug members 38 are held in the adjusted position by spring rings 42, mounted on the sleeve portions of supports 40 having latching ends 44 engaging the flutes or serrations 46 on the plug members 38.

The brake applying means includes a fluid motor 50, secured to the backing plate 12. A piston 52 slidable within a cylinder 53 of the motor 50 operates through a piston rod 54 to urge the friction element 14 against the action of springs 58 into engagement with the brake drum 10. The end of the piston rod 54, engaging the friction element 14, is secured against displacement by a ball and socket type of joint 56.

Means are provided for actuating the brakes mechanically as well as by the above described fluid actuated means. One desirable mechanically actuated embodiment is illustrated in Figure 3, which is independent, and in no way interferes with the aforementioned applying means. This applying means includes a pair of push pins 60, slidably mounted in guides 62, fastened to the backing plate 12, to engage the web 20 of friction element 14 at their inner ends. The outer ends of the pins 60 are engaged by bell crank levers 64 and 66 operated simultaneously to apply the brake, by means of the well-known "push-pull" type of cable and conduit control.

In the modification shown in Figure 7, the end of the piston rod 54 engaging the friction element 14 is seated in a depression 70, formed in the web member 120, and held against displacement by the bifurcated retaining member 72 secured to the web. It will also be noted that the web 120 is provided with a conical flange 74 to which is secured the frustro-conical rim 16.

In operation, the brake is initially applied at but one point, that is, through the fluid motor 50 and piston rod 54. This brings the friction element 14 into drum engagement whereby the element tends to rotate with the drum, thus the links 24 are rocked (see Figure 5) in the direction of drum rotation. Angular movement of the links 24 force the friction element outwardly to further apply the brakes with equal force, and also, in view of the fact that the links cannot rock past their pivotal support, the braking torque is transferred through the cages 22, links 24 and adjustable seats 28 to the backing plate.

When the brakes are released, the springs 58 return the friction element 14 to the "brake-off" position where it is firmly held against lateral displacement by the outer two-point support of the triangular levers 24, and the cages 22, as clearly shown in Figures 1 and 4.

While one illustrative embodiment of the invention has been described in detail, it is not my intention to limit the scope of the invention to the features illustrated and described nor otherwise than by the terms of the appended claims.

I claim:

1. A brake comprising a drum, a rigid annular friction element, means to shift the friction element axially of the brake against the drum to apply the brake, a backing plate, and laterally adjustable generally triangular shaped means mounted on the backing plate and anchored to the friction element to take the torque of the friction element and to further apply said friction element to the drum at points in spaced relation other than the point of initial application.

2. A cone brake comprising a conical drum, a frustro-conical annular friction element, a backing plate, generally triangular shaped means associated with the backing plate and the friction element to apply the brake, and a plurality of axially adjustable members mounted on the backing plate in spaced relation to anchor the friction element to the backing plate and to apply the friction element to the conical drum.

3. A cone brake comprising a drum, a self-energizing annular rigid friction element cooperating therewith, a backing plate, and means comprising a link rockably and laterally adjustably mounted on the backing plate to support the friction element, a box-like structure carried by the friction element to receive the link, said link to anchor and to also apply the friction element in either direction of drum rotation.

4. A cone brake comprising a drum, a self-energizing annular friction element cooperating therewith, a backing plate, and means comprising a plurality of triangular levers rockably supported in adjustable mountings on the backing plate, angular movement of said triangular levers applying the friction element to the drum.

5. A cone brake comprising a drum, a self-energizing annular friction element cooperating therewith, a backing plate, and means comprising a plurality of levers perpendicularly mounted on the backing plate at their apexes, box-like structures carried by the friction element housing said levers.

6. A cone brake comprising a drum, a self-energizing annular friction element cooperating therewith, a backing plate, means comprising a plurality of triangular levers to anchor the friction element to the backing plate and to apply the brake, the apexes of the triangular levers being rockably mounted on the backing plate and having their flat sides opposite the apexes of the triangular levers and contacting the friction element, said friction element having a web and parts secured to said web and formed with end walls projecting from the web and engaged by the ends of said triangular levers, and yielding means maintaining the friction element and triangular levers in position, said yielding means being overcome when applying the brake.

7. A brake shoe comprising a frustro-conical rim, friction means mounted on the outer face of the rim, an annular web supporting the rim and having a conical flange cooperating therewith, a seat formed in the web to receive brake applying means, and means to secure the brake applying means to the brake shoe in swivelling relation.

8. In a braking system, a conical brake drum, a conical rigid friction element, a backing plate, servo means including spaced generally triangular shaped links between the friction element and the backing plate to urge the friction element into engagement with the brake drum, box-like structures carried by the friction element to receive said links, and adjustable means between the backing plate and the servo means.

9. A braking system comprising a conical brake drum, a conical rigid friction element, a backing plate, means associated with the friction element to urge a portion of the friction element into engagement with the brake drum, and servo means comprising spaced generally triangular shaped links positioned in motion limiting means carried by the friction element and fixed with reference to the backing plate to urge the remainder of the friction element into engagement with the brake drum.

10. In a brake mechanism, a conical brake drum, a rigid conical friction element adapted to engage the brake drum, a backing plate, a plurality of generally triangular shaped applying means interposed between the friction element and the backing plate to move the friction element into engagement with the brake drum, motion limiting means carried by the friction element to receive the applying means, laterally adjustable means carried by the backing plate to vary the position of the applying means to compensate for wear of the friction element, hydraulic means to actuate one of said applying means, and yielding means to move the friction element out of engagement with the brake drum.

11. In a braking system, a conical brake drum, a conical rigid friction element, a backing plate, a plurality of servo means including generally triangular shaped links anchored to the friction element and restrained laterally by the backing plate to urge the friction element into engagement with the brake drum, adjustable means between the backing plate and the servo means, means to urge a portion of the friction element into engagement with the brake drum, and yielding means urging the friction element out of engagement with the brake drum.

12. A braking system comprising a conical brake drum, a conical rigid friction element, a backing plate, means associated with the friction element to urge a portion of the friction element into engagement with the brake drum, a plurality of equally spaced servo means including substantially triangular shaped members anchored to the friction element and held against lateral displacement by the backing plate to urge the remainder of the friction element into engagement with the brake drum, and adjustable means between the friction element and the backing plate.

DAVID L. GALLUP.